(12) United States Patent
Kogure et al.

(10) Patent No.: US 10,977,506 B2
(45) Date of Patent: Apr. 13, 2021

(54) APPARATUS FOR DETERMINING VISUAL CONFIRMATION TARGET

(71) Applicant: AISIN SEIKI KABUSHIKI KAISHA, Kariya (JP)

(72) Inventors: Shunsuke Kogure, Kariya (JP); Shin Osuga, Kariya (JP); Shinichiro Murakami, Kariya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 31 days.

(21) Appl. No.: 16/663,532

(22) Filed: Oct. 25, 2019

(65) Prior Publication Data

US 2020/0134336 A1    Apr. 30, 2020

(30) Foreign Application Priority Data

Oct. 29, 2018    (JP) .............................. JP2018-203134

(51) Int. Cl.
*G06K 9/00*    (2006.01)
*G06F 3/01*    (2006.01)
(Continued)

(52) U.S. Cl.
CPC ......... *G06K 9/00845* (2013.01); *G06F 3/013* (2013.01); *G06K 9/00791* (2013.01);
(Continued)

(58) Field of Classification Search
USPC .................................................. 382/103, 104
See application file for complete search history.

(56) References Cited

U.S. PATENT DOCUMENTS

| 7,884,705 B2* | 2/2011 | Nishimura ......... G06K 9/00597 340/436 |
| 8,364,311 B2* | 1/2013 | Heracles .............. G06K 9/4671 700/253 |

(Continued)

FOREIGN PATENT DOCUMENTS

| JP | 2013-41545 A | 2/2013 |
| JP | 2016-73357 A | 5/2016 |

(Continued)

*Primary Examiner* — Ishrat I Sherali
(74) *Attorney, Agent, or Firm* — Sughrue Mion, PLLC

(57) ABSTRACT

An apparatus for determining a visual confirmation target, the apparatus includes a gaze detection portion detecting a gaze direction of a driver for a vehicle, a vehicle information acquisition portion, an image acquisition portion acquiring a captured image, a gaze region extraction portion extracting a gaze region of the driver within the captured image based on a detection result of the gaze direction, a candidate detection portion recognizing objects included in the captured image, generating a top-down saliency map based on the captured image and the vehicle information, and detecting an object having saliency in the top-down saliency map among the recognized objects as a candidate for a visual confirmation target, and a visual confirmation target determination portion determining a visual confirmation target on a basis of an extraction result of the gaze region and a detection result of the candidate for the visual confirmation target.

8 Claims, 8 Drawing Sheets

(51) Int. Cl.
 *G06T 7/70* (2017.01)
 *G06K 9/46* (2006.01)
(52) U.S. Cl.
 CPC ............. *G06K 9/4671* (2013.01); *G06T 7/70* (2017.01); *G06T 2207/30201* (2013.01); *G06T 2207/30268* (2013.01)

(56) References Cited

U.S. PATENT DOCUMENTS

| | | | |
|---|---|---|---|
| 8,487,775 B2* | 7/2013 | Victor | G06K 9/00604 |
| | | | 340/576 |
| 9,095,278 B2* | 8/2015 | Desponds | A61B 6/4441 |
| 9,538,219 B2 | 1/2017 | Sakata et al. | |
| 9,747,812 B2* | 8/2017 | Misu | B60W 50/085 |
| 9,805,278 B2* | 10/2017 | Kitaura | G06K 9/00604 |
| 9,913,578 B2 | 3/2018 | Taguchi et al. | |
| 10,717,447 B2* | 7/2020 | Isa | B60W 50/14 |
| 10,882,398 B2* | 1/2021 | Cordell | G06T 7/70 |
| 2005/0209749 A1* | 9/2005 | Ito | B60R 1/00 |
| | | | 701/36 |
| 2012/0200490 A1* | 8/2012 | Inada | G06F 3/013 |
| | | | 345/156 |
| 2020/0130578 A1* | 4/2020 | Murakami | G06K 9/0061 |

FOREIGN PATENT DOCUMENTS

| | | |
|---|---|---|
| JP | 2016-130959 A | 7/2016 |
| WO | 2012/105196 A1 | 8/2012 |

\* cited by examiner

F I G. 1
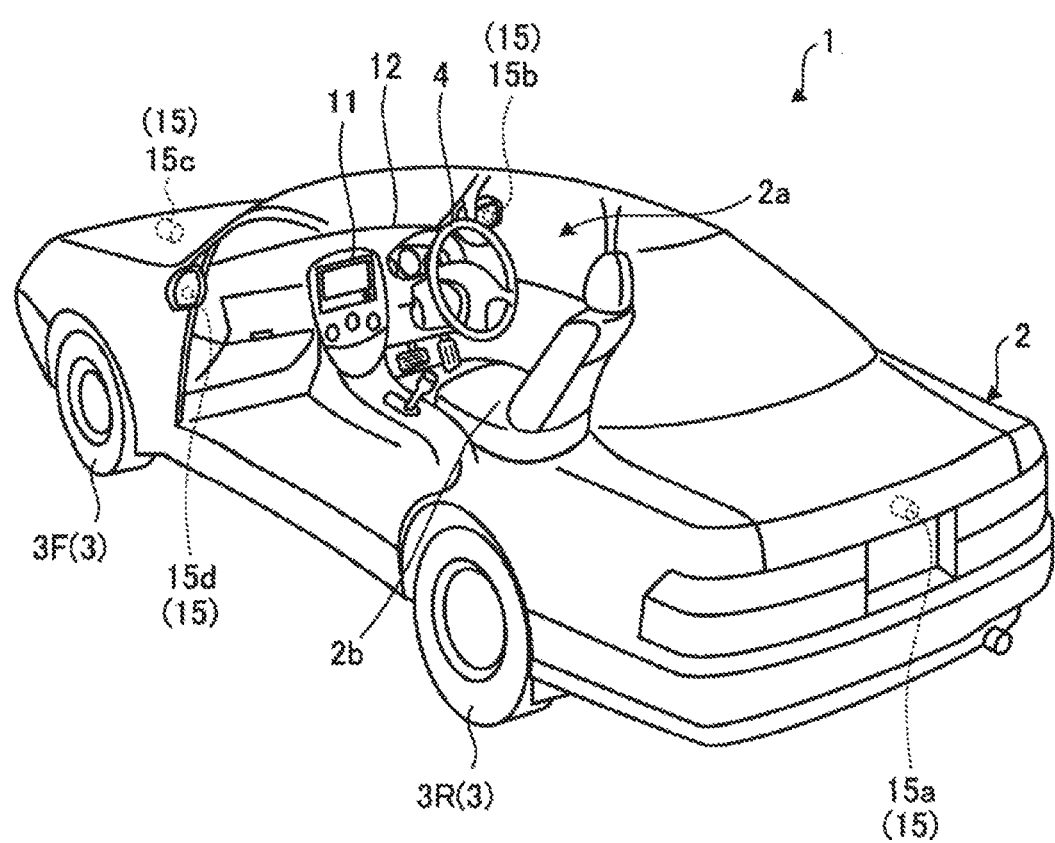

APPARATUS FOR DETERMINING VISUAL CONFIRMATION TARGET

CROSS REFERENCE TO RELATED APPLICATIONS

This application is based on and claims priority under 35 U.S.C. § 119 to Japanese Patent Application 2018-203134, filed on Oct. 29, 2018, the entire content of which is incorporated herein by reference.

TECHNICAL FIELD

This disclosure generally relates to an apparatus for determining a visual confirmation target.

BACKGROUND DISCUSSION

According to a known technique such as disclosed in WO2012/105196A, JP2013-41545A, JP2016-73357A, and JP2016-130959A, for example, a saliency region is acquired in an image displayed on a screen, so that a correlation between the acquired saliency region and a detection result of user's gaze direction is calculated. Based on the calculation result of such correlation, a degree of user's interest in the image is estimated.

In the aforementioned technique, the degree of user's interest in the image is estimated on the assumption that the user is immobile when looking at the image displayed on the screen, for example. In a case where the user is moving, i.e., in a case where a vehicle driver serving as the user is moving together with a vehicle, for example, it may be difficult to highly accurately determine a subject which is looked or gazed by the driver (such subject serving as a visual confirmation target).

A need thus exists for an apparatus for determining a visual confirmation target which is not susceptible to the drawback mentioned above.

SUMMARY

According to an aspect of this disclosure, an apparatus for determining a visual confirmation target, the apparatus includes a gaze detection portion detecting a gaze direction of a driver for a vehicle, a vehicle information acquisition portion acquiring vehicle information indicating a driving state of the vehicle, an image acquisition portion acquiring a captured image from an imaging device that captures an image in surroundings of the vehicle, a gaze region extraction portion extracting a gaze region at which the driver looks within the captured image based on a detection result of the gaze direction detected by the gaze detection portion, a candidate detection portion recognizing objects included in the captured image, generating a top-down saliency map for the captured image based on the captured image and the vehicle information, and detecting an object having saliency in the top-down saliency map among the recognized objects as a candidate for a visual confirmation target at which the driver looks, and a visual confirmation target determination portion determining a visual confirmation target at which the driver looks on a basis of an extraction result of the gaze region and a detection result of the candidate for the visual confirmation target.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating a vehicle of which an interior is partially looked through, the vehicle at which an apparatus for determining a visual confirmation target according to a first embodiment is mounted;

DETAILED DESCRIPTION

Figure 2:
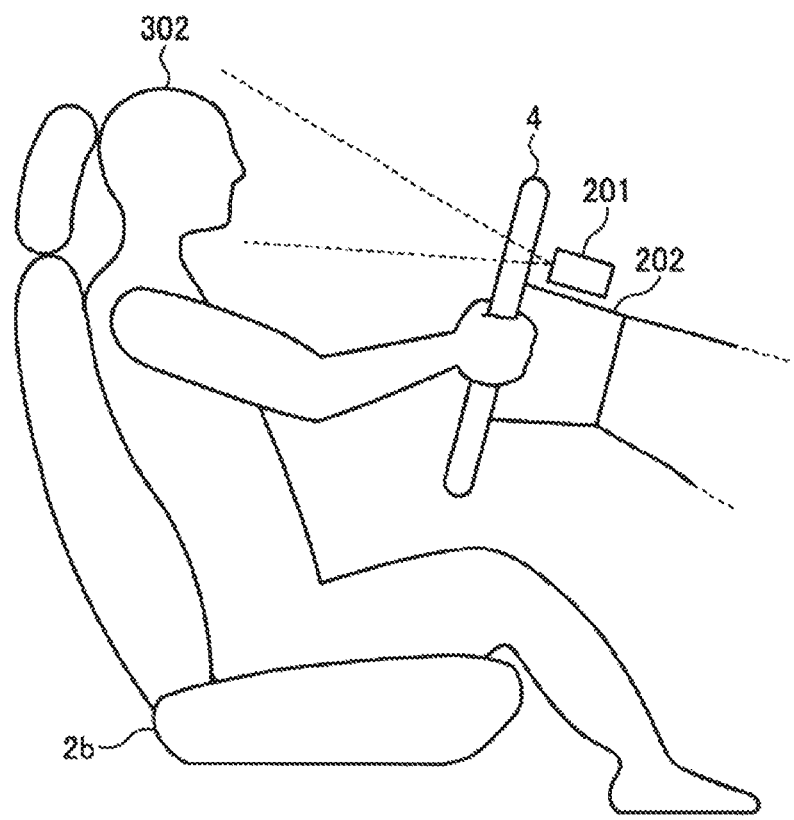
FIG. 2 is a diagram illustrating an arrangement of a driver monitoring camera at the vehicle according to the first embodiment.

Embodiments disclosed here are explained with reference to the attached drawings. Configurations of the embodiments described below, and operations, results, and effects brought about by such configurations are examples. The embodiments are achievable by other configurations than the following configurations and at least one of various effects based on the basic configuration and derived effects may be obtained.

A vehicle at which an apparatus for determining a visual confirmation target according to the embodiments is mounted may be an automobile including an internal combustion engine (engine) as a driving source (i.e., an internal combustion engine automobile), an automobile including an electric motor (motor) as a driving source (i.e., an electric automobile and a fuel cell automobile, for example), or an automobile including both the engine and the motor as a driving source (i.e., a hybrid automobile), for example. The vehicle may include any types of transmission devices and any types of devices including systems and components, for example, for driving the internal combustion engine or the electric motor. A system, the number, and a layout, for example, of a device related to driving of wheels of the vehicle may be appropriately employed or specified.

A first embodiment is explained with reference to FIGS. 1 and 2. As illustrated in FIG. 1, a vehicle 1 includes a vehicle body 2, a steering portion 4, and a monitor device 11.

The vehicle body 2 includes a vehicle interior 2a where a driver is in. The steering portion 4, for example, is provided within the vehicle interior 2a so as to be opposed to a seat 2b for a driver serving as a passenger. The steering portion 4 is a steering wheel (a steering handle) protruding from a dashboard (an instrument panel) 12, for example.

The monitor device 11 is provided at a substantially center of the dashboard 12 in a vehicle width direction, i.e., in a right and left direction, thereof. The monitor device 11 includes a display device 8 (see FIG. 3) and an audio output device 9 (see FIG. 3). The display device 8 is a liquid crystal display (LCD) or an organic electroluminescent display (OELD), for example. The audio output device 9 is a speaker, for example. The display device 8 is covered with an operation input portion 10 (see FIG. 3) that is transparent such as a touch panel, for example.

A passenger of the vehicle 1 may visually confirm an image displayed at a display screen of the display device 8 via the operation input portion 10. The passenger may visually confirm the image displayed at the display screen of the display device 8 via the operation input portion 10. The passenger may perform an operation input by touching, pressing down, or moving the operation input portion 10 with one's finger, for example, at a position corresponding to the image displayed at the display screen of the display device 8.

As illustrated in FIG. 2, a driver monitoring camera 201 is mounted at a handle column 202. The driver monitoring camera 201 is constituted by a charge coupled device (CCD), for example. A view angle and a position of the driver monitoring camera 201 are adjusted so that the face of a driver 302 seated on the seat 2b is positioned at a center of a field of vision of the camera 201. The driver monitoring camera 201 sequentially captures an image of the face of the driver 302 and sequentially outputs image data of such captured image.

As illustrated in FIG. 1, the vehicle 1 is a four-wheel automobile, for example, while including right and left front wheels 3F and right and left rear wheels 3R. All of the aforementioned four wheels 3 (3F and 3R) are steerable.

As illustrated in FIG. 1, the vehicle 1 is equipped with plural imaging devices 15 (onboard cameras). In the present embodiment, the vehicle 1 includes four imaging devices 15a to 15d, for example. Each of the imaging devices 15 is a digital camera incorporating an imaging element such as a charge coupled device (CCD) and a CMOS image sensor (CIS), for example. The imaging device 15 may capture an image of surroundings of the vehicle 1 at a predetermined frame rate. The imaging device 15 outputs a captured image obtained by capturing the image of the surroundings of the vehicle 1. The imaging device 15 has a wide-angle lens or a fisheye lens and may photograph a range of, for example, 140° to 220° in a horizontal direction. An optical axis of the imaging device 15 may be possibly set obliquely downward.

Specifically, the imaging device 15a is positioned at a rear end portion of the vehicle body 2 and is provided at a wall portion below a trunk lid, for example. The imaging device 15a may capture an image of a rear region of the vehicle 1 among the surroundings of the vehicle 1. The imaging device 15b is positioned at a right side of the vehicle body 2, i.e., at a right-end portion in the vehicle width direction and is provided at a right-side door mirror, for example. The imaging device 15b may capture an image of a lateral region of the vehicle 1 among the surroundings of the vehicle 1. The imaging device 15c is positioned at a front side of the vehicle body 2, i.e., at a front end portion of the vehicle 1 in a front-rear direction and is provided at a front bumper or a front grill, for example. The imaging device 15c may capture an image of a front region of the vehicle 1 among the surroundings of the vehicle 1. The imaging device 15d is positioned at a left side of the vehicle body 2, i.e., at a left-end portion in the vehicle width direction and is provided at a left-side door mirror, for example. The imaging device 15d may capture an image of a lateral region of the vehicle 1 among the surroundings of the vehicle 1.

Figure 3:
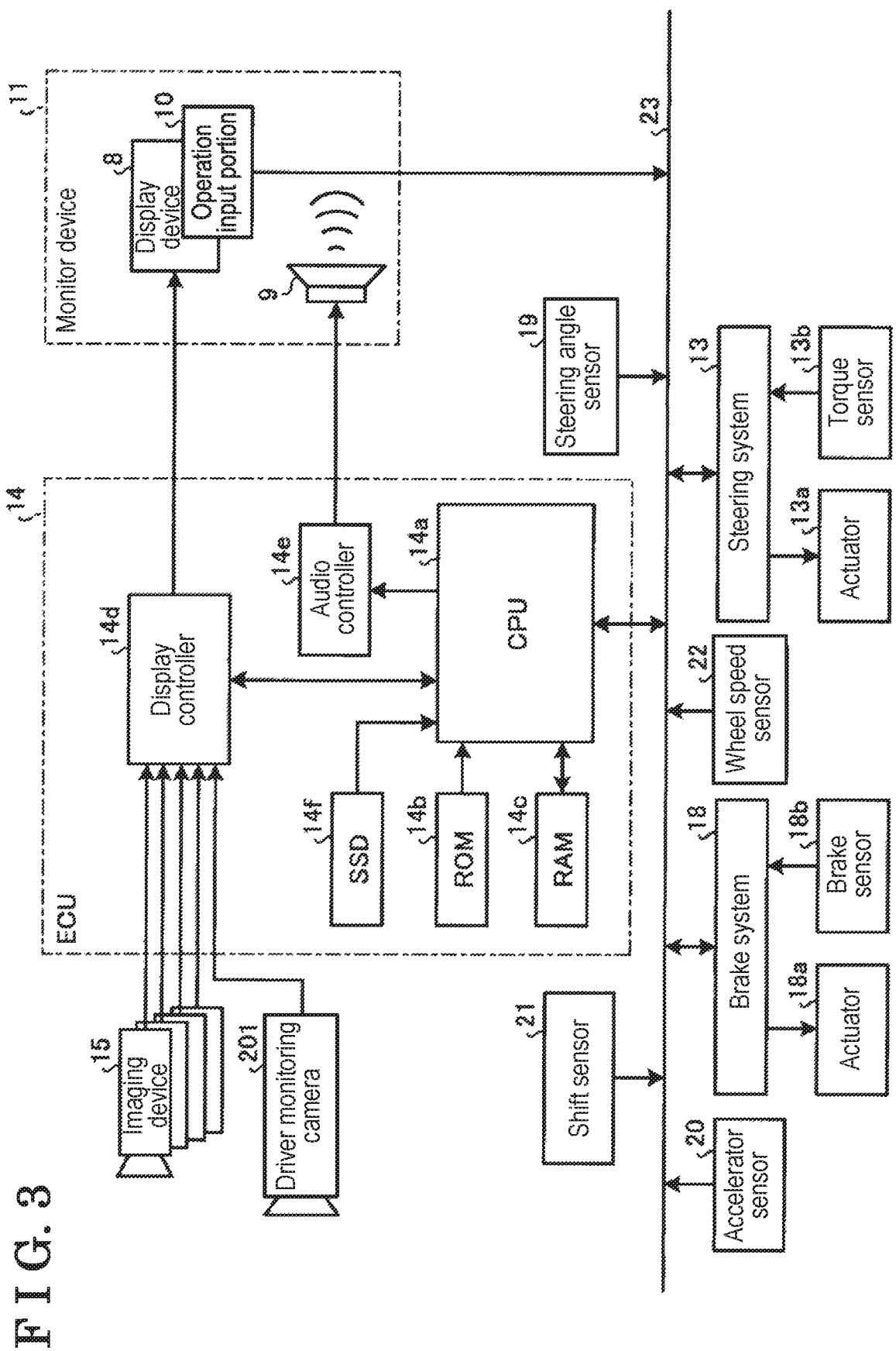
FIG. 3 is a block diagram of a functional configuration of the vehicle according to the first embodiment.

Next, a functional configuration of the vehicle 1 according to the present embodiment is explained with reference to FIG. 3. As illustrated in FIG. 3, the vehicle 1 includes an electronic control unit (ECU) 14, the monitor device 11, a steering system 13, a brake system 18, a steering angle sensor 19, an accelerator sensor 20, a shift sensor 21, and a wheel speed sensor 22, for example, which are electrically connected to one another via an in-vehicle network 23 serving as an electrical communication line. The in-vehicle network 23 is configured as a controller area network (CAN), for example.

The steering system 13 is an electric power steering system or a steer by wire (SBW) system, for example. The steering system 13 includes an actuator 13a and a torque sensor 13b. The steering system 13 that is electrically controlled by the ECU 14, for example, operates the actuator 13a so that a torque is applied to the steering portion 4 as supplemental steering force. The steering portion 4 steers the wheels 3 accordingly. The torque sensor 13b detects a torque applied to the steering portion 4 by the driver and transmits a detection result to the ECU 14.

The brake system 18 includes an anti-lock brake system (ABS) restraining the wheels of the vehicle 1 from locking during braking, an electronic stability control (ESC) restraining skidding of the vehicle 1 upon cornering thereof, an electric (power) brake system performing a braking assist by enhancing a braking force, and a brake by wire (BBW). The brake system 18 includes an actuator 18a and a brake sensor 18b, for example. The brake system 18 is electrically controlled by the ECU 14, for example, so as to apply a braking force to each of the wheels 3 via the actuator 18a. The brake system 18 may perform a control for restraining the wheels of the vehicle 1 from locking during braking, free spin of the wheels 3, and skidding by detecting a sign of locking of the wheels, free spin of the wheels 3, and skidding of the vehicle 1 based on difference in rotations between the right and left wheels 3, for example. The brake sensor 18b is a displacement sensor detecting a position of the brake pedal serving as a movable part of a braking operation portion. The brake sensor 18b transmits a detection result of the position of the brake pedal to the ECU 14.

The steering angle sensor 19 detects a steering amount of the steering portion 4 such as a steering wheel, for example. In the embodiment, the steering angle sensor 19, which is configured with a Hall element, for example, detects a rotation angle of a rotary part of the steering portion 4 as the steering amount and transmits a detection result to the ECU 14. The accelerator sensor 20 is a displacement sensor detecting a position of the accelerator pedal serving as a movable part of an accelerating operation portion. The accelerator sensor 20 transmits a detection result to the ECU 14.

The shift sensor 21 detects a position of a movable part of a gear change operation portion (for example, a bar, an arm, and a button) and transmits a detection result to the ECU 14. The wheel speed sensor 22 including a Hall element, for example, detects an amount of rotations of the wheel 3 and the number of rotations (a rotation speed) thereof per time unit and transmits a detection result to the ECU 14.

The ECU 14 that is constituted by a computer, for example, entirely controls the vehicle 1 in a state where hardware and software operate in cooperation with each other. Specifically, the ECU 14 includes a central processing unit (CPU) 14a, a read only memory (ROM) 14b, a random access memory (RAM) 14c, a display controller 14d, an audio controller 14e, and a solid state drive (SSD) (flash memory) 14f. The CPU 14a entirely controls the vehicle 1. The CPU 14a reads out program installed and stored at a non-volatile storage unit such as the ROM 14b, for example, and performs an arithmetic processing based on such program.

The ROM 14b stores various programs and parameters for executing such programs, for example. The RAM 14c tentatively stores various data used for calculation at the CPU 14a. The display controller 14d mainly performs an image processing with image data acquired by each imaging device 15 that captures an image in the surroundings of the vehicle 1 and synthesis of image data displayed at the display device 8 among the arithmetic processing performed at the ECU 14. The audio controller 14e mainly performs a processing of audio data output from the audio output device 9 among the arithmetic processing performed at the ECU 14. The SSD 14f that is a rewritable non-volatile storage unit is configured to store data even when a power source of the ECU 14 is turned off.

The CPU 14a, the ROM 14b, and the RAM 14c, for example, may be integrated within the same package. The ECU 14 may be constructed to use another arithmetic logic processor or logic circuit such as a digital signal processor (DSP), for example, instead of the CPU 14a. In addition, a hard disk drive (HDD) may be provided instead of the SSD 14f, or the SSD 14f and the HDD may be provided separately from the ECU 14, for example. The configurations, arrangements, and electric connections of the aforementioned sensors and actuators, for example, are examples and may be appropriately specified or changed.

Figure 4:
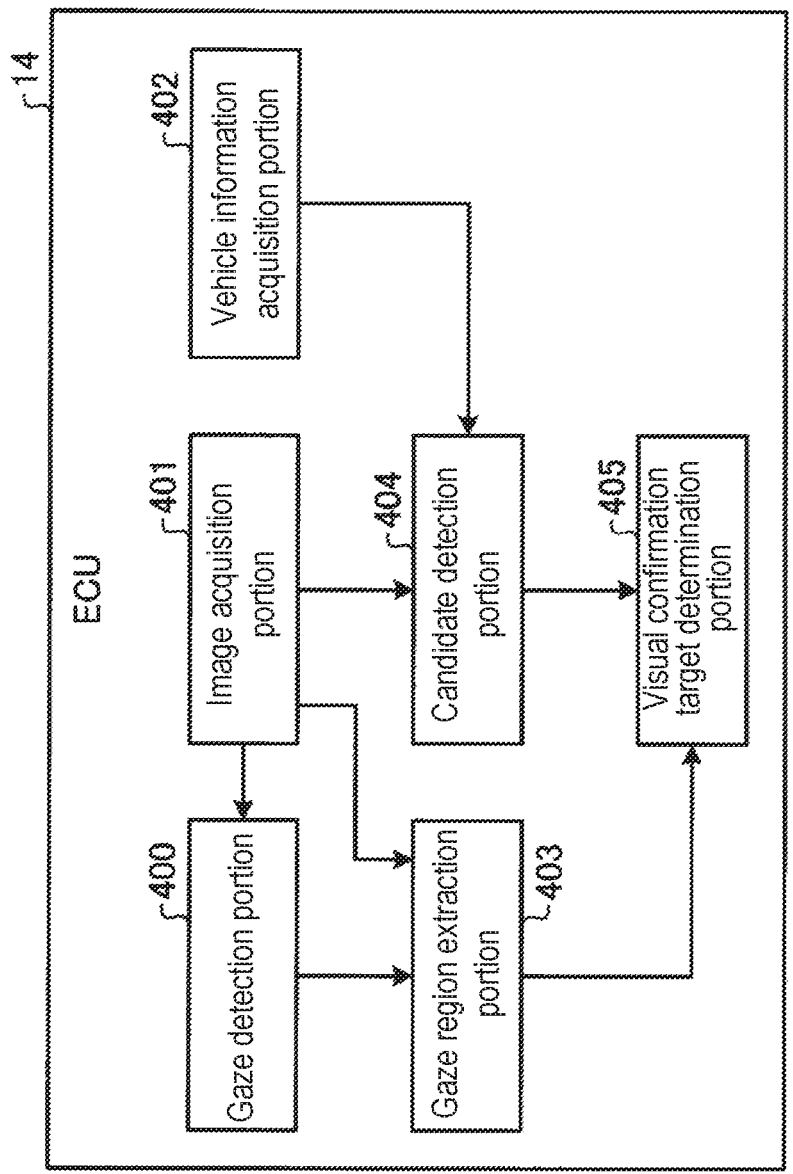
FIG. 4 is a block diagram of a functional configuration of an ECU provided at the vehicle according to the first embodiment.

Next, a functional configuration of the ECU 14 provided at the vehicle 1 according to the present embodiment is explained with reference to FIG. 4. As illustrated in FIG. 4, the ECU 14 mainly includes a gaze detection portion 400, an image acquisition portion 401, a vehicle information acquisition portion 402, a gaze region extraction portion 403, a candidate detection portion 404, and a visual confirmation target determination portion 405. The gaze detection portion 400, the image acquisition portion 401, the vehicle information acquisition portion 402, the gaze region extraction portion 403, the candidate detection portion 404, and the visual confirmation target determination portion 405 are achieved by the CPU 14a of the ECU 14 executing the program stored at the ROM 14b. Alternatively, the aforementioned configurations may be achieved by hardware. In the present embodiment, the ECU 14 functions as an apparatus for determining a visual confirmation target.

The image acquisition portion 401 functions as an acquisition portion acquiring a captured image from the imaging device 15 that captures an image in a travelling direction of the vehicle 1. In the present embodiment, the image acquisition portion 401 acquires the captured image obtained by the imaging device 15. Alternatively, the image acquisition portion 401 may acquire an image representing a measurement result of a distance between the vehicle 1 and an object in the surroundings of the vehicle 1 measured by a light detection and ranging (LIDAR), a time of flight (TOF) camera, a millimeter-wave radar, or an ultrasonic sensor, for example, as a captured image. In the present embodiment, the image acquisition portion 401 acquires the captured image obtained by the driver monitoring camera 201 that captures an image of the driver 302.

The vehicle information acquisition portion 402 functions as an acquisition portion acquiring vehicle information. The vehicle information serves as information indicating a driving state of the vehicle 1, such as a steering amount of the steering portion 4 detected by the steering angle sensor 19 and a speed of the vehicle 1 based on the number of rotations (rotation speed) of the wheel 3 detected by the wheel speed sensor 22, for example.

The gaze detection portion 400 detects a gaze direction of the driver 302 of the vehicle 1. The gaze detection portion 400 also detects the direction (position) of the face of the driver 302. In the present embodiment, the gaze detection portion 400 detects the image of the face and the eyes of the driver 302 from the captured image obtained by the driver monitoring camera 201 that captures the image of the driver 302. The gaze detection portion 400 detects the gaze direction and the direction of the face of the driver 302 based on the aforementioned image of the face and the eyes of the driver 302.

The gaze region extraction portion 403 extracts a gaze region at which the driver 302 looks or gazes in the captured image acquired by the image acquisition portion 401 based on the detection result of the gaze direction by the gaze detection portion 400.

The candidate detection portion 404 performs an object recognition processing for recognizing an object included in the captured image acquired by the image acquisition portion 401. The candidate detection portion 404 generates a top-down saliency map for the captured image based on the captured image acquired by the image acquisition portion 401 and the vehicle information acquired by the vehicle information acquisition portion 402.

The top-down saliency map is an unambiguously determined saliency map including and absorbing differences among individuals such as an order of looking at objects, a physique, and a habit of the driver 302, for example, ambiguity of a scene from which a captured image is obtained, and fluctuation in gaze direction detected by the gaze detection portion 400, for example. The candidate detection portion 404 compares the top-down saliency map and positions of objects recognized according to the object recognition processing. The candidate detection portion 404 then detects an object having saliency in the top-down saliency map, among the aforementioned recognized objects, as a candidate for a visual confirmation target which may be highly possibly looked or gazed by the driver 302 (i.e., a candidate for a visual confirmation target at which the driver 302 actually looks). In the present embodiment, the candidate detection portion 404 detects the object including saliency equal to or greater than a predetermined saliency in the top-down saliency map as the candidate for the visual confirmation target among the objects recognized according to the object recognition processing.

The visual confirmation target determination portion 405 determines the visual confirmation target at which the driver 302 looks on a basis of the extraction result of the gaze region by the gaze region extraction portion 403 and the detection result of the candidate for the visual confirmation target by the candidate detection portion 404.

Because the vehicle information is utilized for generating the top-down saliency map, the candidate detection portion 404 may generate the top-down saliency map by predicting how the vehicle 1 moves. How the vehicle 1 moves is closely related to what the driver 302 pays attention to or observes in the surroundings of the vehicle 1.

Consequently, accuracy of generating the top-down saliency map that indicates saliency at the visual confirmation target at which the driver 302 of the vehicle 1 may highly possibly looks may increase. The visual confirmation target at which the driver 302 of the vehicle 1 looks may be further accurately determined accordingly.

Next, a processing of extracting the gaze region by the gaze region extraction portion 403 of the vehicle 1 is explained with reference to FIG. 5.

Figure 5:
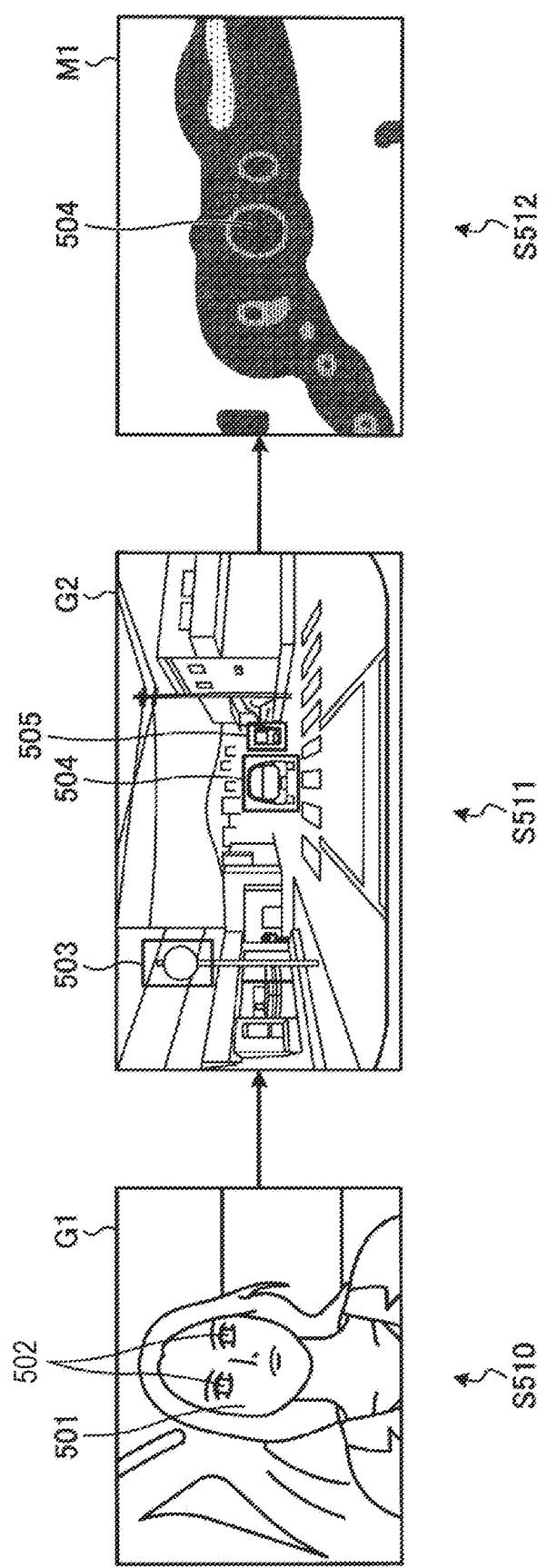
FIG. 5 is a diagram explaining a processing of extracting a gaze region by a gaze region extraction portion of a vehicle according to the first embodiment.

In the present embodiment, as illustrated in FIG. 5, the gaze detection portion 400 detects a face 501 and eyes 502 of the driver 302 from a captured image G1 that is obtained by the driver monitoring camera 201 capturing an image of the driver 302. The gaze detection portion 400 detects the gaze direction of the driver 302 based on the angle of the detected face 501 and the movement of the detected eyes 502, for example (step S510).

As illustrated in FIG. 5, the gaze region extraction portion 403 superimposes gaze regions 503 to 505 (regions) that are obtained on a basis of the gaze direction detected by the gaze detection portion 400 on a captured image G2 acquired by the image acquisition portion 401 (for example, a captured image in front of the vehicle 1) (S511).

The gaze region extraction portion 403 generates a gaze region likelihood map M1 where the gaze region (for example, the gaze region 504) at which the driver 302 most likely looks is identifiable among the aforementioned gaze regions 503 to 505, using a distribution of the gaze regions 503 to 505 which are based on the gaze direction detected by the gaze detection portion 400 (step S512).

Specifically, the gaze region extraction portion 403 extracts a region that is most likely to be looked by the driver 302 among regions in the captured image G1 obtained on a basis of the gaze direction detected by the gaze detection portion 400 as the gaze region. The visual confirmation target is thus determinable on a basis of the gaze region at which the driver 302 looks with higher possibility. The visual confirmation target where the driver 302 looks may be thus further accurately determined.

A processing of generating the top-down saliency map by the candidate detection portion 404 of the vehicle 1 according to the present embodiment is explained with reference to FIG. 6.

Figure 6:
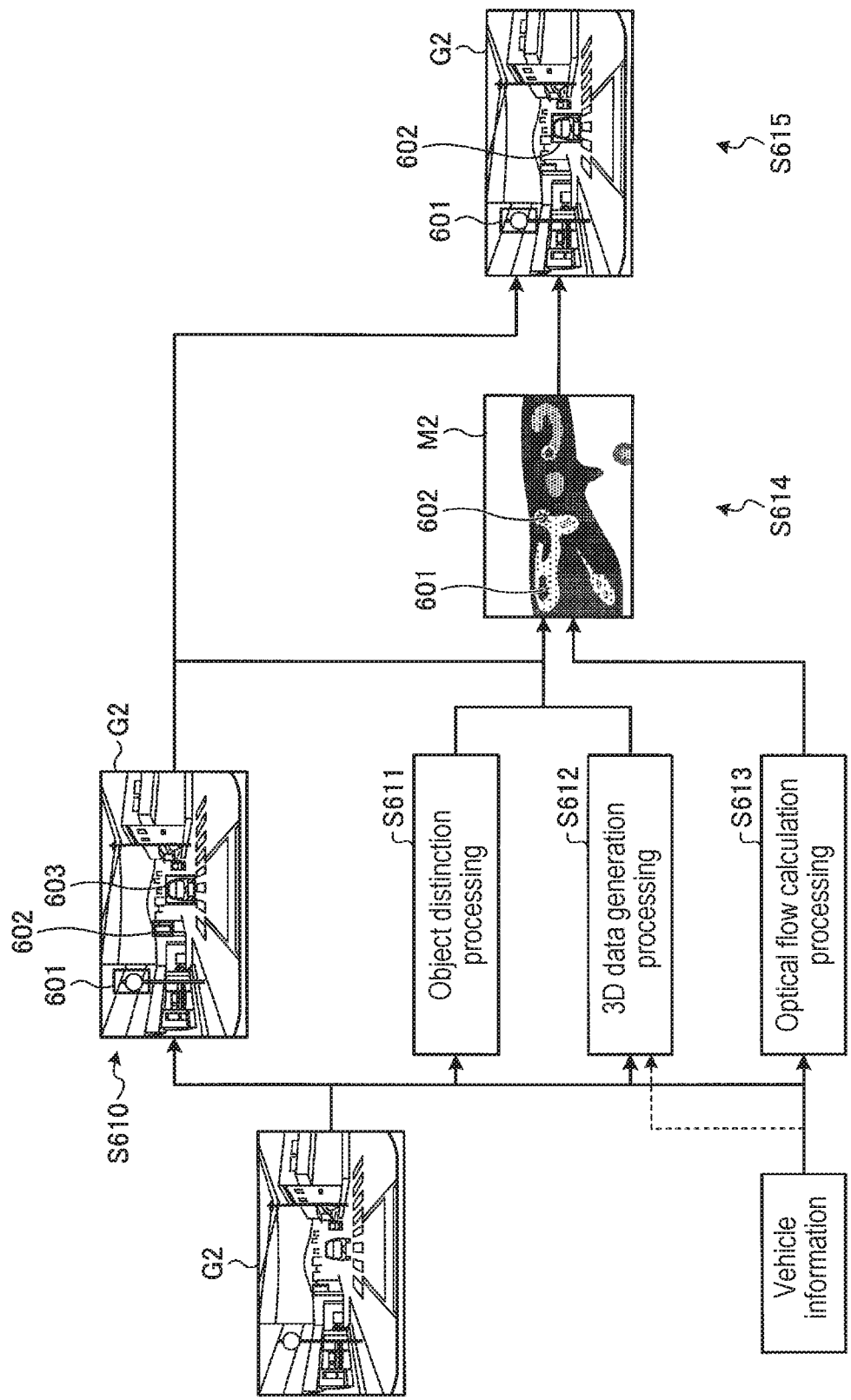
FIG. 6 is a diagram explaining a processing of generating a top-down saliency map by a candidate detection portion of the vehicle according to the first embodiment.

In the present embodiment, as illustrated in FIG. 6, the candidate detection portion 404 performs the object recognition processing on the captured image G2 (the captured image in front of the vehicle 1, for example) acquired by the image acquisition portion 401 to recognize objects 601 to 603 included in the captured image G2 (step S610).

The candidate detection portion 404 also performs an object distinction processing so as to distinguish between the objects 601 to 603 included in the captured image G2 (step S611) as illustrated in FIG. 6. The candidate detection portion 404 further performs a 3D data generation processing for generating an image (which is hereinafter referred to as virtual 3D data) where a distance between the vehicle 1 and each object in the surroundings of the vehicle 1 is identifiable on a basis of the captured image G2 and the vehicle information (step S612).

The candidate detection portion 404 further performs an optical flow calculation processing for obtaining an optical flow of each object included in the captured image G2 based on the captured image G2 and the vehicle information as illustrated in FIG. 6 (step S613). The candidate detection portion 404 then performs a saliency map generation processing for generating a top-down saliency map M2 including saliency at the objects 601 and 602 at which the driver 302 highly possibly looks by predicting how the vehicle 1 moves on a basis of the recognition result of the objects 601 to 603 included in the captured image G2, the result of the object distinction processing performed on the captured image G2, the virtual 3D data, and the calculation result of optical flows of the objects 601 to 603 included in the captured image G2 (step S614).

The candidate detection portion 404 compares the positions of the objects 601 to 603 recognized in the captured image G2 and the top-down saliency map M2 to detect the object(s) (for example, the objects 601 and 602) at which the driver 302 highly possibly looks among the objects 601 to 603, as the candidate for the visual confirmation target (step S615).

The candidate detection portion 404 calculates a degree of reliability that the driver 302 looks at the aforementioned detected candidate for the visual confirmation target based on the direction of the face 501 (see FIG. 5) detected by the gaze detection portion 400. In the present embodiment, the candidate detection portion 404 is configured to give a higher degree of reliability to the candidate for the visual confirmation target that exists in the same direction as the face 501 detected by the gaze detection portion 400. For example, the candidate detection portion 404 gives a higher degree of reliability to the object 602 than the object 601, the objects 601 and 602 serving as the candidates for the visual confirmation, included in the captured image G2 in a case where the face 501 is directed forward.

Figure 7:
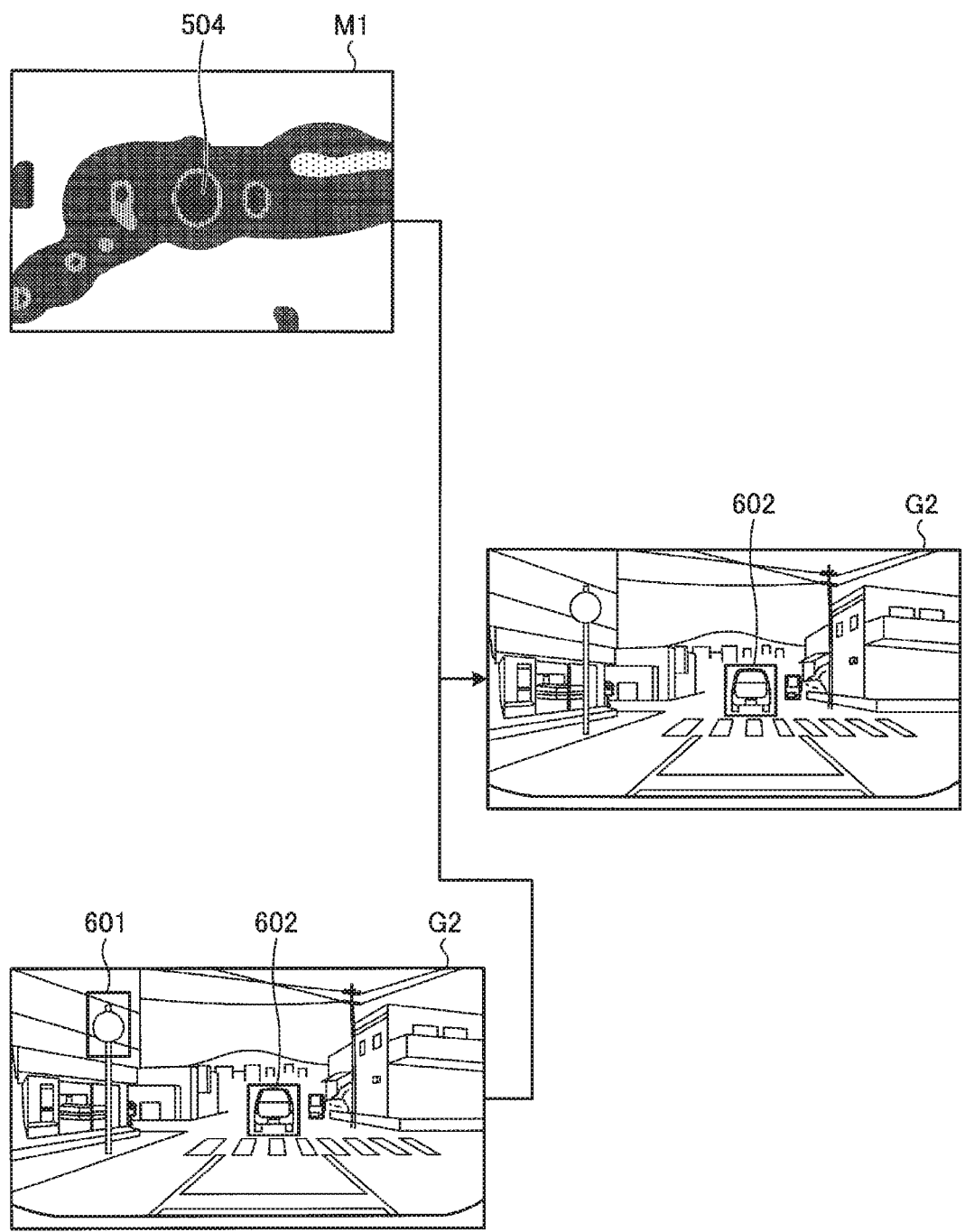
FIG. 7 is a diagram explaining a processing of determining a visual confirmation target by a visual confirmation target determination portion of the vehicle according to the first embodiment.

A processing of determining the visual confirmation target by the visual confirmation target determination portion 405 of the vehicle 1 according to the present embodiment is explained with reference to FIG. 7.

The visual confirmation target determination portion 405 compares the gaze region likelihood map M1 generated at step S512 in FIG. 5 and the candidates for the visual confirmation target detected in the captured image G2 at step S615 in FIG. 6 (i.e., the objects 601 and 602) to determine the visual confirmation target at which the driver 302 actually looks (for example, the object 602).

In the present embodiment, the visual confirmation target determination portion 405 obtains a distance between the gaze region 504 extracted by the gaze region extraction portion 403 (i.e., the region including saliency in the gaze region likelihood map M1) within the captured image G2 and each candidate for the visual confirmation target (i.e., the objects 601 and 602, for example) detected by the candidate detection portion 404. The visual confirmation target determination portion 405 then determines the visual confirmation target at which the driver 302 actually looks, on a basis of the aforementioned distance between the gaze region 504 and each of the objects 601, 602 each serving as the candidate for the visual confirmation target and a degree of reliability of each of the objects 601 and 602.

For example, in a case where a product of the distance between the object 602 and the gaze region 504 and the degree of reliability given to the object 602 is greater than a product of the distance between the object 601 and the gaze region 504 and the degree of reliability given to the object 601, the visual confirmation target determination portion 405 determines that the driver 302 looks at the object 602 (other vehicle on the road, for example) as the visual confirmation target.

Even in a case where plural objects are detected as the candidates for the visual confirmation target by the candidate detection portion 404 or positions of plural candidates for the visual confirmation target fail to match the gaze region extracted by the gaze region extraction portion 403, the candidate for the visual confirmation target at which the driver 302 highly possibly looks is determinable as the visual confirmation target. The visual confirmation target is thus further accurately determinable.

According to the first embodiment, the top-down saliency map is generated with the vehicle information. The top-down saliency map indicating saliency at the visual confirmation target at which the driver 302 of the vehicle 1 highly possibly looks may be thus further accurately generated. The visual confirmation target at which the driver 302 of the vehicle 1 looks may be further accurately determinable.

A second embodiment is explained below. In the second embodiment, a candidate for a gaze direction (a gaze direction candidate) of a driver related to driving of a vehicle is detected as the gaze direction of the driver among candidates for every gaze direction of the driver. Explanations for the same constructions as those of the first embodiment are omitted.

Figure 8:
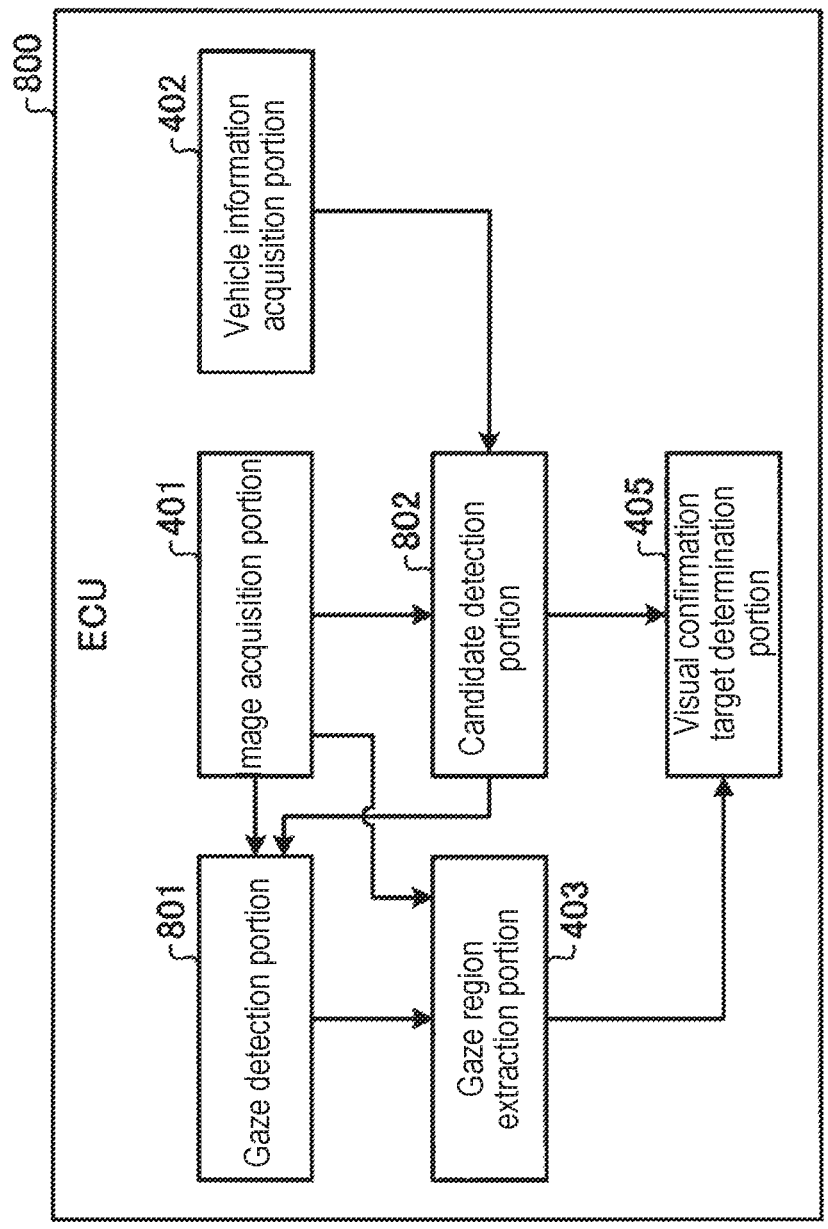
FIG. 8 is a block diagram of a functional configuration of a vehicle according to a second embodiment.

A functional configuration of an ECU provided at the vehicle according to the second embodiment is explained with reference to FIG. 8. As illustrated in FIG. 8, an ECU 800 includes a gaze detection portion 801, the image acquisition portion 401, the vehicle information acquisition portion 402, the gaze region extraction portion 403, a candidate detection portion 802, and the visual confirmation target determination portion 405. The gaze detection portion 801, the image acquisition portion 401, the vehicle information acquisition portion 402, the gaze region extraction portion 403, the candidate detection portion 802, and the visual confirmation determination portion 405 are achieved by the CPU 14a of the ECU 800 executing program stored at the ROM 14b. Alternatively, the aforementioned configurations may be achieved by hardware.

The candidate detection portion 802 generates a top-down saliency map based on a captured image acquired at a predetermined position among captured images acquired by the image acquisition portion 401. The aforementioned predetermined position corresponds to a position at which the gaze direction of the driver 302 related to driving of the vehicle 1 is detected. For example, the predetermined position corresponds to an intersection, a position where a signal is placed, a curved road, and a road fork, for example, which are related to driving of the vehicle 1 and are highly possibly looked by the driver 302 of the vehicle 1. The top-down saliency map including high saliency at objects where the driver 302 may highly possibly look during the driving of the vehicle 1 may be thus generated. The accuracy of determining the visual confirmation target at which the driver 302 looks may improve.

The gaze detection portion 801 detects every gaze direction of the driver 302 as candidates for the gaze direction. In the second embodiment, the gaze detection portion 801 detects every gaze direction of the driver 302 based on the image of the face and the eyes of the driver 302 included in the captured image captured by the driver monitoring camera 201 as the candidates for the gaze direction. Next, the gaze detection portion 801 compares the candidates for the gaze direction and the top-down saliency map generated by the candidate detection portion 802. The gaze detection portion 801 detects, among the candidates for the gaze direction, the gaze direction candidate related to the driving of the vehicle 1 as the gaze direction of the driver 302. In the second embodiment, the gaze detection portion 801 detects and determines the gaze direction candidate relative to an object including saliency in the top-down saliency map as the gaze direction of the driver 302 among the candidates for the gaze direction.

The plural gaze directions of the driver 302 obtained while the driver 302 is driving the vehicle 1 not only include gaze directions substantially related to the driving of the vehicle 1 but also include gaze directions not related to the driving of the vehicle 1 (for example, a gaze direction for a commercial advertisement or the sky, and a gaze direction obtained at the time the driver 302 loses one's way, for example). The detection of gaze direction substantially related to the driving of the vehicle 1 is important for an application that determines whether the driver 302 looks at an object related to the driving in surroundings of the vehicle 1, i.e., an application for determining whether the driver 302 misses a pedestrian, for example. The gaze direction not related to the driving of the vehicle 1 is important for an application used for expanding information of an advertisement or providing detailed information of an advertisement, for example, but is less important for the application that determines whether the driver 302 looks at an object related to the driving in surroundings of the vehicle 1.

The technique for correcting the gaze direction detected by the gaze detection portion 801 using the saliency map has been developed. Nevertheless, according to the aforementioned technique, the detected gaze direction is corrected regardless of whether such detected gaze direction is related to the driving of the vehicle 1. The determination of whether the driver 302 looks at an object related to the driving of the vehicle 1 is thus applied also to the gaze direction not related to the driving of the vehicle 1. The accuracy of determining whether the driver 302 looks at an object related to the driving of the vehicle 1 may decrease.

Thus, according to the second embodiment, the gaze detection portion 801 detects and determines the gaze direction candidate related to the driving of the vehicle 1, among candidates for every gaze direction of the driver 302, as the gaze direction of the driver 302 based on the top-down saliency map. Whether the driver 302 looks at the visual conformation target at which the driver 302 should look while the driver 203 is driving the vehicle 1 is inhibited from being determined on a basis of the gaze direction not related to the driving of the vehicle 1. Consequently, accuracy of determining whether the driver 302 looks at the object that should be visually confirmed by the driver 302 while the driver 302 is driving the vehicle 1 may improve.

According to the second embodiment, whether the driver 302 looks at the visual conformation target at which the driver 302 should look while the driver 203 is driving the vehicle 1 is inhibited from being determined on a basis of the gaze direction not related to the driving of the vehicle 1. Consequently, accuracy of determining whether the driver 302 looks at the object that should be visually confirmed by the driver 302 while the driver 302 is driving the vehicle 1 may improve.

According to the aforementioned embodiments, an apparatus for determining a visual confirmation target, the apparatus includes a gaze detection portion 400, 801 detecting a gaze direction of a driver 302 for a vehicle 1, a vehicle information acquisition portion 402 acquiring vehicle information indicating a driving state of the vehicle 1, an image acquisition portion 401 acquiring a captured image from an imaging device 15 that captures an image in surroundings of the vehicle 1, a gaze region extraction portion 403 extracting a gaze region at which the driver 302 looks within the captured image based on a detection result of the gaze direction detected by the gaze detection portion 400, 801, a candidate detection portion 404, 802 recognizing objects included in the captured image, generating a top-down saliency map for the captured image based on the captured image and the vehicle information, and detecting an object having saliency in the top-down saliency map among the recognized objects as a candidate for a visual confirmation target at which the driver 302 looks, and a visual confirmation target determination portion 405 determining a visual confirmation target at which the driver 302 looks on a basis of an extraction result of the gaze region and a detection result of the candidate for the visual confirmation target.

Accuracy in determining the visual confirmation target at which the driver 302 of the vehicle 1 looks may thus improve.

According to the second embodiment, the candidate detection portion 802 generates the top-down saliency map based on the captured image acquired at a predetermined position among plural captured images acquired by the image acquisition portion 401. The gaze detection portion 801 detects a gaze direction candidate related to driving of the vehicle 1 among candidates for every gaze direction of the driver 302 based on the top-down saliency map.

Accuracy in determining whether the driver 302 looks at the visual confirmation target at which the driver 302 should look while the driver 302 is driving the vehicle 1 may thus improve.

According to the aforementioned embodiments, the gaze detection portion 400, 801 detects a direction of the face of the driver 302. The candidate detection portion 404, 802 calculates a degree of reliability that the driver 302 looks at the candidate for the visual confirmation target based on the direction of the face of the driver 302 detected by the gaze detection portion 400, 801. The visual confirmation target determination portion 405 determines the visual confirmation target at which the driver 302 looks on a basis of a distance between the gaze region within the captured image and the candidate for the visual confirmation target, and the degree of reliability of the candidate for the visual confirmation target.

Accuracy in determining the visual confirmation target may thus improve when plural objects are detected as candidates for the visual confirmation target by the candidate detection portion 404, 802 or when positions of plural candidates for the visual confirmation target fail to match the gaze region extracted by the gaze region extraction portion 403.

According to the aforementioned embodiments, the gaze region extraction portion 403 extracts a region that is most likely to be looked by the driver 302 among regions in the captured image obtained on a basis of the gaze direction detected by the gaze detection portion 400 as the gaze region.

Accuracy in determining the visual confirmation target at which the driver 302 looks may thus improve.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for determining a visual confirmation target, the apparatus comprising:
   a gaze detection portion detecting a gaze direction of a driver for a vehicle;
   a vehicle information acquisition portion acquiring vehicle information indicating a driving state of the vehicle;
   an image acquisition portion acquiring a captured image from an imaging device that captures an image in surroundings of the vehicle;
   a gaze region extraction portion extracting a gaze region at which the driver looks within the captured image based on a detection result of the gaze direction detected by the gaze detection portion;
   a candidate detection portion recognizing objects included in the captured image, generating a top-down saliency map for the captured image based on the captured image and the vehicle information, and detecting an object having saliency in the top-down saliency map among the recognized objects as a candidate for a visual confirmation target at which the driver looks; and
   a visual confirmation target determination portion determining a visual confirmation target at which the driver looks on a basis of an extraction result of the gaze region and a detection result of the candidate for the visual confirmation target.

2. The apparatus according to claim 1, wherein the candidate detection portion generates the top-down saliency map based on the captured image acquired at a predetermined position among a plurality of the captured images acquired by the image acquisition portion,
   the gaze detection portion detects a gaze direction candidate related to driving of the vehicle among candidates for every gaze direction of the driver based on the top-down saliency map.

3. The apparatus according to claim 1, wherein the gaze detection portion detects a direction of the face of the driver,
   the candidate detection portion calculates a degree of reliability that the driver looks at the candidate for the visual confirmation target based on the direction of the face of the driver detected by the gaze detection portion,
   the visual confirmation target determination portion determines the visual confirmation target at which the driver looks on a basis of a distance between the gaze region within the captured image and the candidate for the visual confirmation target, and the degree of reliability of the candidate for the visual confirmation target.

4. The apparatus according to claim 2, wherein the gaze detection portion detects a direction of the face of the driver,
   the candidate detection portion calculates a degree of reliability that the driver looks at the candidate for the visual confirmation target based on the direction of the face of the driver detected by the gaze detection portion,
   the visual confirmation target determination portion determines the visual confirmation target at which the driver looks on a basis of a distance between the gaze region within the captured image and the candidate for the visual confirmation target, and the degree of reliability of the candidate for the visual confirmation target.

5. The apparatus according to claim 1, wherein the gaze region extraction portion extracts a region that is most likely to be looked by the driver among regions in the captured image obtained on a basis of the gaze direction detected by the gaze detection portion as the gaze region.

6. The apparatus according to claim 2, wherein the gaze region extraction portion extracts a region that is most likely to be looked by the driver among regions in the captured image obtained on a basis of the gaze direction detected by the gaze detection portion as the gaze region.

7. The apparatus according to claim 3, wherein the gaze region extraction portion extracts a region that is most likely to be looked by the driver among regions in the captured image obtained on a basis of the gaze direction detected by the gaze detection portion as the gaze region.

8. The apparatus according to claim 5, wherein the gaze region extraction portion extracts a region that is most likely to be looked by the driver among regions in the captured image obtained on a basis of the gaze direction detected by the gaze detection portion as the gaze region.

\* \* \* \* \*